United States Patent
Ishikawa et al.

(10) Patent No.: US 11,460,653 B2
(45) Date of Patent: Oct. 4, 2022

(54) OPTICAL-ELECTRIC COMPOSITE CABLE AND METHOD FOR MANUFACTURING THE SAME

(71) Applicant: SUMITOMO ELECTRIC INDUSTRIES, LTD., Osaka (JP)

(72) Inventors: Hiroki Ishikawa, Osaka (JP); Yasuhiro Maeda, Osaka (JP); Taisuke Nagasaki, Osaka (JP); Takeshi Inoue, Osaka (JP); Tatsuhiko Naito, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/168,278

(22) Filed: Feb. 5, 2021

(65) Prior Publication Data

US 2021/0263249 A1    Aug. 26, 2021

(30) Foreign Application Priority Data

Feb. 25, 2020    (JP) .............................. JP2020-029435

(51) Int. Cl.
*G02B 6/44* (2006.01)
*H01B 11/20* (2006.01)
*H01B 11/10* (2006.01)

(52) U.S. Cl.
CPC ......... *G02B 6/4416* (2013.01); *G02B 6/4432* (2013.01); *G02B 6/4486* (2013.01); *H01B 11/1025* (2013.01); *H01B 11/20* (2013.01)

(58) Field of Classification Search
CPC ..... G02B 6/4416; G02B 6/4432; H01B 11/22
See application file for complete search history.

(56) References Cited

U.S. PATENT DOCUMENTS

| | | | | |
|---|---|---|---|---|
| 4,272,155 A | * | 6/1981 | Slaughter | G02B 6/441 385/101 |
| 6,195,486 B1 | * | 2/2001 | Field | G02B 6/4486 385/103 |
| 2014/0338969 A1 | | 11/2014 | Sakabe et al. | |
| 2018/0314027 A1 | | 11/2018 | Ishikawa et al. | |

FOREIGN PATENT DOCUMENTS

| | | | | | |
|---|---|---|---|---|---|
| CN | 108766646 A | * | 11/2018 | ........... | H01B 7/1875 |
| EP | 853249 A1 | * | 7/1998 | ........... | G02B 6/4416 |
| JP | H0612921 A | * | 1/1994 | ........... | G02B 6/4416 |
| JP | 10319283 A | * | 12/1998 | ........... | G02B 6/4416 |
| JP | 2004-265780 A | | 9/2004 | | |
| JP | 2012-053121 A | | 3/2012 | | |
| JP | 2013-218916 A | | 10/2013 | | |
| JP | 2014-078435 A | | 5/2014 | | |
| JP | 2018-185982 A | | 11/2018 | | |
| WO | WO-8806742 A1 | * | 9/1988 | ........... | G02B 6/4422 |

* cited by examiner

*Primary Examiner* — Charlie Y Peng
(74) *Attorney, Agent, or Firm* — Faegre Drinker Biddle & Reath LLP

(57) ABSTRACT

An optical-electric composite cable includes a cable unit, at least one metal wire, and a sheath. The cable unit includes at least one optical fiber and a twisted pair wire twisted with the at least one optical fiber. The at least one metal wire is disposed around the cable unit. The sheath surrounds the cable unit and the at least one metal wire.

18 Claims, 7 Drawing Sheets

OPTICAL-ELECTRIC COMPOSITE CABLE AND METHOD FOR MANUFACTURING THE SAME

CROSS-REFERENCE

This application is based upon and claims the benefit of priority from Japanese Patent Application No. 2020-029435, filed on Feb. 25, 2020, the entire contents of which are incorporated herein by reference.

TECHNICAL FIELD

The present disclosure relates to an optical-electric composite cable and a method for manufacturing an optical-electric composite cable.

BACKGROUND

JP2013-218916A discloses an example of an optical-electric composite cable having optical fibers and metal wires (electrical wires). The optical-electric composite cable includes a unit in which the optical fibers are bundled up in a ribbon shape and an outer circumference thereof is surrounded by a tube-shaped resin. The metal wires are disposed to surround the unit in the optical-electric composite cable. JP2014-078435A, JP2012-053121A, JP2018-185982A, and JP2004-265780A each disclose another example of an optical-electric composite cable.

SUMMARY

The present disclosure provides an optical-electric composite cable. The optical-electric composite cable includes a cable unit, at least one metal wire, and a sheath. The cable unit includes at least one optical fiber and a twisted pair wire twisted with the at least one optical fiber. The at least one metal wire is disposed around the cable unit. The sheath surrounds the cable unit and the at least one metal wire.

The present disclosure provides a method for manufacturing an optical-electric composite cable. The manufacturing method includes forming a cable unit by twisting at least one optical fiber and a twisted pair wire, disposing at least one metal wire around the cable unit, and forming a sheath to surround the cable unit and the at least one metal wire.

BRIEF DESCRIPTION OF THE DRAWINGS

The foregoing and other purposes, aspects and advantages will be better understood from the following detailed description of embodiments of the disclosure with reference to the drawings, in which.

TECHNICAL PROBLEM

Figure 1:
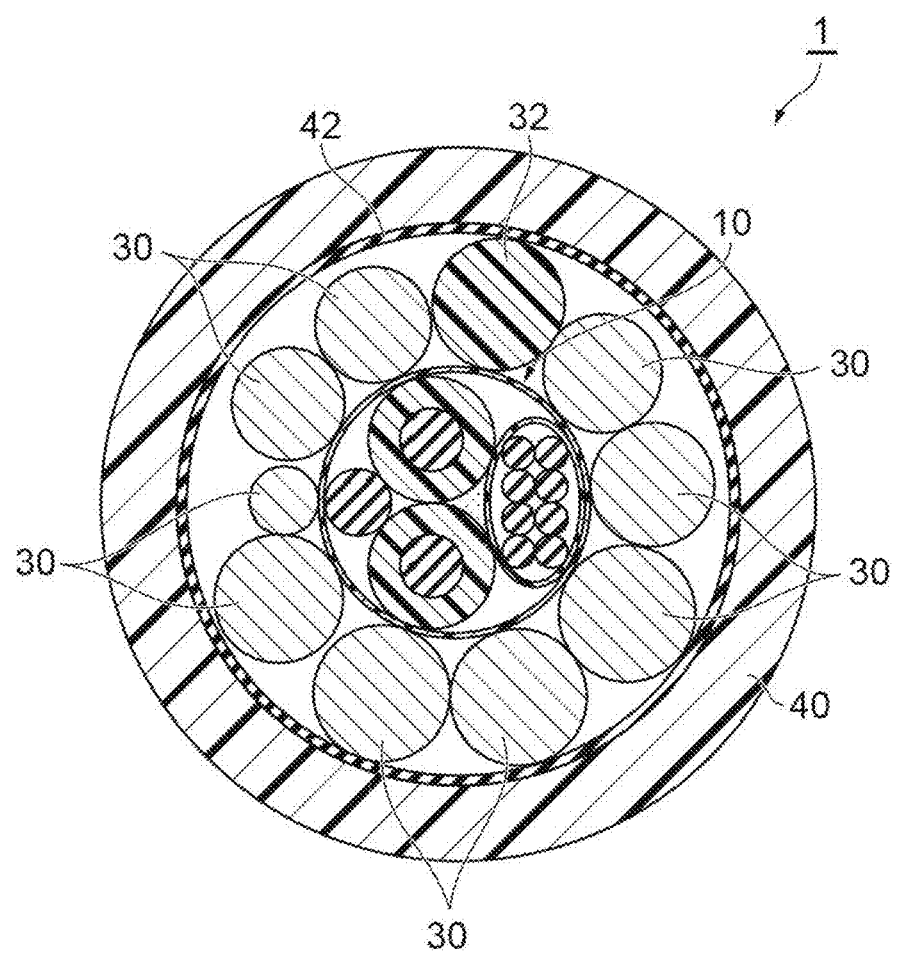
FIG. 1 is a cross-sectional view of an optical-electric composite cable according to one embodiment of the present disclosure.

The optical-electric composite cable described in JP2013-218916A employs a configuration in which the metal wires are disposed around the optical fiber unit disposed at a center. When a twisted pair wire is added to this configuration, it is conceivable to dispose the twisted pair wire around the optical fiber unit together with other metal wires. Since an outer diameter of the twisted pair wire is larger than an outer diameter of a general metal wire, a portion at which the twisted pair wire is positioned bulges outward significantly compared to portions at which the metal wires are positioned. Therefore, when the twisted pair wire is applied as it is to the conventional configuration, a shape of the optical-electric composite cable can be distorted or a size thereof may increase.

Advantageous Effects of Invention

According to the present disclosure, it is possible to provide an optical-electric composite cable which is thin and has a satisfactory external appearance while including a twisted pair wire and a method for manufacturing the same.

Solution to Problem

Details of embodiments of the present disclosure will be listed and described. An optical-electric composite cable according to one embodiment of the present disclosure includes a cable unit, at least one metal wire, and a sheath. The cable unit includes at least one optical fiber and a twisted pair wire twisted with the at least one optical fiber. The at least one metal wire is disposed around the cable unit. The sheath surrounds the cable unit and the at least one metal wire.

In the above optical-electric composite cable, the optical fiber and the twisted pair wire are twisted together to form the cable unit, and the metal wire is disposed around the cable unit. That is, it is configured such that the twisted pair wire is disposed on an inward side from a position at which the metal wire is disposed in the optical-electric composite cable. In this case, the twisted pair wire does not protrude significantly to the outside of the optical-electric composite cable, and thus distorted bulging is suppressed. Thus, an optical-electric composite cable can have a satisfactory external appearance. In addition, the twisted pair wire is disposed by effectively utilizing a region close to the optical fiber, thereby a thin optical-electric composite cable can be formed. Therefore, according to the present embodiment, it is possible to realize an optical-electric composite cable which is thin and has a satisfactory external appearance while including a twisted pair wire.

As one embodiment, the cable unit may be disposed at substantially a center of the sheath. According to this aspect, it is possible to realize an optical-electric composite cable which is thin as a whole and has a satisfactory external appearance by utilizing a region around the cable unit in a well-balanced manner.

As one embodiment, the at least optical fiber may includes a plurality of optical fibers, and the cable unit may include a first tape wound around the plurality of optical fibers. According to this aspect, the plurality of optical fibers are bundled up with each other by the first tape. In a manufacturing process of the optical-electric composite cable, it is possible to prevent loosened optical fibers from being sandwiched between the twisted pair wire and being damaged, and thus stabilizing and improving a manufacturing efficiency of the optical-electric composite cable can be achieved. In this embodiment, the first tape may be spirally wound around the plurality of optical fibers in a direction in which the cable unit extends.

As one embodiment, the first tape may be a resin tape and may be formed of polyethylene terephthalate having a thickness of 50 μm or more and 500 μm or less. According to this aspect, since the first tape is formed of polyethylene terephthalate having a thickness of 50 μm or more and has a sufficient strength, the first tape can be prevented from being torn when it is wound around the optical fibers. Since the first tape has a thickness of 500 μm or less, the optical-electric composite cable becoming thicker by an amount of that of the first tape can be prevented.

As one embodiment, the cable unit may include a second tape wound around the at least one optical fiber and the twisted pair wire. According to this aspect, the optical fiber and the twisted pair wire are bundled up and not separated by the second tape that is wound around the cable unit. Thus, a trouble in which the optical fiber or the twisted pair wire that is loosened becomes entangled in the manufacturing apparatus during manufacture of the optical-electric composite cable can be prevented, and manufacturing efficiency of the optical-electric composite cable can be stabilized. In this case, the tape may be formed of a composite material containing a metal material and a synthetic resin. According to this aspect, the second tape containing a metal material functions as a shield and can block noise entering the twisted pair wire from the outside of the optical-electric composite cable. Therefore, communication using the optical-electric composite cable can be stabilized. In this embodiment, the second tape may contain at least one of a copper foil and an aluminum foil, and a polyethylene terephthalate resin.

As one embodiment, the second tape may be spirally wound around the at least one optical fiber and the twisted pair wire in a direction in which the cable unit extends. The second tape may be wound such that winding portions thereof adjacent to each other are partially overlapped. Also, the second tape may be flat between a point in contact with the twisted pair wire and a point in contact with the first tape wound around the at least one optical fiber.

As one embodiment, the cable unit may include a drain wire which is disposed to be sandwiched between the twisted pair wire and the second tape. In this embodiment, the drain wire may be a conducting wire made of a metal.

As one embodiment, the cable unit may include a tensile strength fiber which extends linearly in a direction in which the cable unit extends on an inner side thereof. According to this aspect, the tensile strength fiber can prevent the optical fiber from being stretched and broken. In this embodiment, the tensile strength fiber may be disposed in at least one region of a region adjacent to the optical fiber, a region between the optical fiber and the twisted pair wire, a region between a pair of metal wires constituting the twisted pair wire, and a region between the twisted pair wire and the drain wire.

A method for manufacturing an optical-electric composite cable according to one embodiment includes, forming a cable unit by twisting at least one optical fiber and a twisted pair wire, disposing at least one metal wire around the cable unit, and forming a sheath to surround the cable unit and the at least one metal wire.

According to this manufacturing method, the optical fiber and the twisted pair wire are twisted into a unit, and the metal wire is disposed around the unit. Thus, the twisted pair wire does not protrude significantly to the outside of the optical-electric composite cable, and thus the optical-electric composite cable in which distorted bulging is suppressed can be manufactured. Since it is not necessary to provide a tube-shaped resin into which a bundle of the optical fibers is inserted, a thin optical-electric composite cable can be formed.

As one embodiment of the above-described manufacturing method, the at least one optical fiber may includes a plurality of optical fibers, and the forming of the cable unit may include forming an optical fiber bundle by winding a resin tape around the plurality of optical fibers. Also, the forming of the cable unit may include winding a composite tape containing a metal material and a synthetic resin around the at least one optical fiber and the twisted pair wire.

DETAILED DESCRIPTION

Specific examples of an optical-electric composite cable and a method for manufacturing the same according to the present disclosure will be described below with reference to the drawings. The present disclosure is not limited to these examples and is defined by the scope of the claims and is intended to include meanings equivalent to the claims and all modified examples within the scope. In the description of the drawings, the same elements will be denoted by the same reference signs, and duplicate description thereof will be omitted.

FIG. 1 is a cross-sectional view of an optical-electric composite cable 1 according to one embodiment. FIG. 1 illustrates a cross section obtained when the optical-electric composite cable 1 is cut in a direction perpendicular to a central axis direction. The optical-electric composite cable 1 includes a cable unit 10, a plurality of metal wires 30, an intervening string 32, a sheath 40, and a metal braid 42.

The cable unit 10 is a bundle of cables including optical fibers and a twisted pair wire, and is housed inside the sheath 40. A detailed configuration of the cable unit 10 will be described with reference to FIG. 2.

Figure 2:
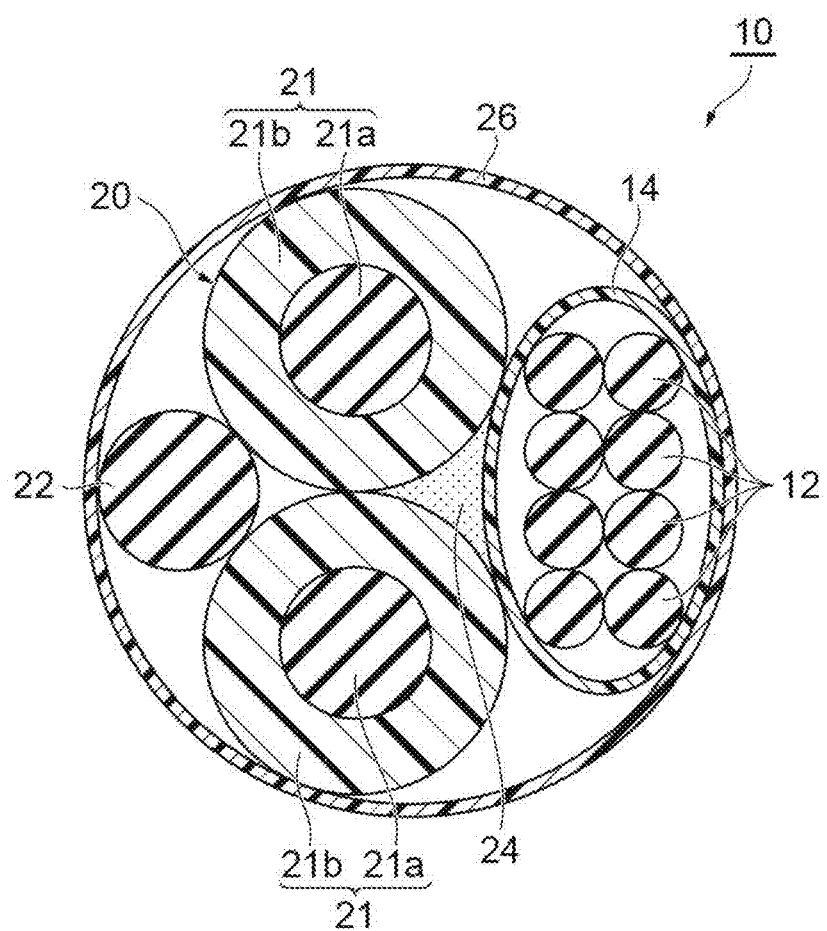
FIG. 2 is a cross-sectional view of a cable unit of the optical-electric composite cable illustrated in FIG. 1.

FIG. 2 is a cross-sectional view of the cable unit 10 included in the optical-electric composite cable 1. As illustrated in FIG. 2, the cable unit 10 includes a plurality of optical fibers 12, a resin tape 14, a twisted pair wire 20, a drain wire 22, a tensile strength fiber 24, and a composite tape 26.

The optical fibers 12 are each an optical fiber in which an outer side of a bare optical fiber is coated with an ultraviolet curable resin, a nylon resin, or the like. The optical fiber 12 may have a diameter of, for example, 0.25 mm or more and 0.9 mm or less. As an example in the present embodiment, the optical-electric composite cable 1 includes eight optical fibers 12, but the present disclosure is not limited thereto. The number of optical fibers 12 included in the optical-electric composite cable 1 can be one or more. Generally, the optical-electric composite cable 1 may include an even number of optical fibers 12.

The resin tape 14 is a tape wound around the plurality of optical fibers 12 (see FIG. 5) and is, for example, spirally wound to be continuous in a direction in which the optical-electric composite cable 1 extends. The resin tape 14 may be wound such that end portions of adjacent winding portions of the tape overlap each other or may be wound such that a slight gap is formed between end portions of adjacent winding portions of the tape. The resin tape 14 bundles up the plurality of optical fibers 12. The resin tape 14 is formed of a synthetic resin and may be formed of, for example, a polyethylene terephthalate (PET) resin. The resin tape may have a thickness of, for example, 50 μm or more and 500 μm or less.

The twisted pair wire 20 is a cable formed by twisting a pair of metal wires 21 together at a predetermined pitch. The twisted pair wire 20 is used for transmitting and receiving electrical signals or the like between electronic devices connected to each other by the optical-electric composite cable 1. Each of the pair of metal wires 21 constituting one twisted pair wire 20 includes a metal conducting wire 21a and an insulating sheath 21b covering the metal conducting wire 21a. The metal conducting wire 21a may be constituted by, for example, a single wire made of a copper wire plated with tin or a copper alloy, or a conductor obtained by twisting a plurality (for example, seven) of single wires made of a copper wire plated with tin or a copper alloy together. The metal conducting wire 21a may have an outer diameter of, for example, 0.3 mm or more and 0.65 mm or less. A material of the sheath 21b may be, for example, polyvinyl chloride or polyethylene. The sheath 21b may have a thickness of, for example, 0.1 mm or more and 0.23 mm or less, and an outer diameter of 0.6 mm or more and 1.1 mm or less.

The drain wire 22 is a ground wiring for the composite tape 26 that functions as a shield. The drain wire 22 is disposed to be sandwiched between the twisted pair wire 20 and the composite tape 26. The drain wire 22 is constituted by, for example, bundling bare metal wires.

The tensile strength fiber 24 is a fiber that extends in a direction in which the cable unit 10 extends. The tensile strength fiber 24 is positioned inside the composite tape 26 and is disposed to extend linearly without twisting. The tensile strength fiber 24 is disposed in, for example, a region adjacent to the optical fibers 12 (the resin tape 14), a region between the optical fibers 12 (the resin tape 14) and the twisted pair wire 20, a region between the pair of metal wires 21 constituting the twisted pair wire 20, or a region between the twisted pair wire 20 and drain wire 22. The tensile strength fiber 24 has a tensile strength, and may be, for example, a synthetic fiber of polyamide (e.g. aramid fiber). The tensile strength fiber 24 can be disposed as linearly as possible to effectively exhibit a tensile strength. When the tensile strength fiber 24 is disposed near the optical fibers 12, breakage of the optical fibers 12 is prevented.

The composite tape 26 is a composite tape wound around the plurality of optical fibers 12, the twisted pair wire 20, and the drain wire 22. When the composite tape 26 is caused to function as a shield layer, the composite tape 26 is formed of a composite material containing a metal material and a synthetic resin (plastic material). As an example, the composite tape 26 may be a metal resin tape in which a copper foil or an aluminum foil is formed on a resin tape formed of polyethylene terephthalate (PET) resin. When the composite tape 26 is formed of a material containing a metal material, the composite tape 26 functions as a shield for the twisted pair wire 20 housed inside.

Referring to FIG. 1 again, a position of the cable unit 10 in the optical-electric composite cable 1 will be described. The cable unit 10 is disposed substantially at a center of the sheath 40. Here, "the cable unit 10 being disposed substantially at a center of the sheath 40" indicates a case in which the cable unit 10 is disposed so that a central axis of the sheath 40 is inside an outer edge of the cable unit 10 (on an inner side of the composite tape 26 in the present embodiment) in a cross section of the optical-electric composite cable 1 illustrated in FIG. 1. That is, a central axis of the cable unit 10 does not necessarily have to coincide with the central axis of the sheath 40.

An internal structure of the optical-electric composite cable 1 will be described with reference to FIG. 1. The plurality of metal wires 30 are disposed around the cable unit 10. Each of the metal wires 30 is a cable in which an outer side of the metal conducting wire is covered with an insulating sheath. Each of the metal wire 30 is used for supplying electric power, transmitting and receiving an electric signal, or the like between electronic devices connected to each other by the optical-electric composite cable 1. In the present embodiment, nine metal wires 30 are disposed, but the number of metal wires 30 can be one or more. Although the metal wires 30 having different outer diameter sizes are disposed in the embodiment, outer diameter sizes of the metal wires 30 are arbitrary, and all the metal wires 30 may have the same outer diameter size. Even at a largest outer diameter, the metal wire 30 has, for example, an outer diameter of 0.5 mm or more and 1.5 mm or less. The metal wire 30 has an outer diameter smaller than a range in which the twisted pair wire 20 is twisted around the central axis, that is, a range defined by an outer diameter of the composite tape 26 in the present embodiment. In other words, an outer diameter of the cable unit 10 is larger than an outer diameter of the metal wire 30.

The intervening string 32 is disposed on an outer side of the cable unit 10 between the metal wires 30 different from each other. The intervening string 32 is used to fill voids generated between the metal wires 30, and prevents a positional deviation of the metal wires 30 inside the optical-electric composite cable 1. As the intervening string 32, for example, PP yarn made of polypropylene that has been subjected to a low shrinkage treatment may be used.

The sheath 40 surrounds the cable unit 10 and the plurality of metal wires 30, and protects the entire optical-electric composite cable 1. The sheath 40 is formed in a cylindrical shape to house the cable unit 10 and the metal wires 30 therein. A material of the sheath 40 may be, for example, polyvinyl chloride (PVC), polyethylene, or an ethylene-vinyl acetate copolymer resin. The sheath 40 may have, for example, a thickness of 0.1 mm or more and 0.5 mm or less, and an outer diameter of 2 mm or more and 10 mm or less.

The metal braid 42 is further provided between the plurality of metal wires 30 and the sheath 40. The metal braid 42 functions as a shield that blocks electromagnetic noise entering the metal wires 30 and the cable unit 10 from the outside, and enables a stable communication by the optical-electric composite cable 1. The metal braid 42 may be one in which, for example, a metal conducting wire such as a single wire made of a copper wire plated with tin or a copper alloy is braided. The metal braid 42 may have a thickness of, for example, about 0.1 mm.

Figure 3:
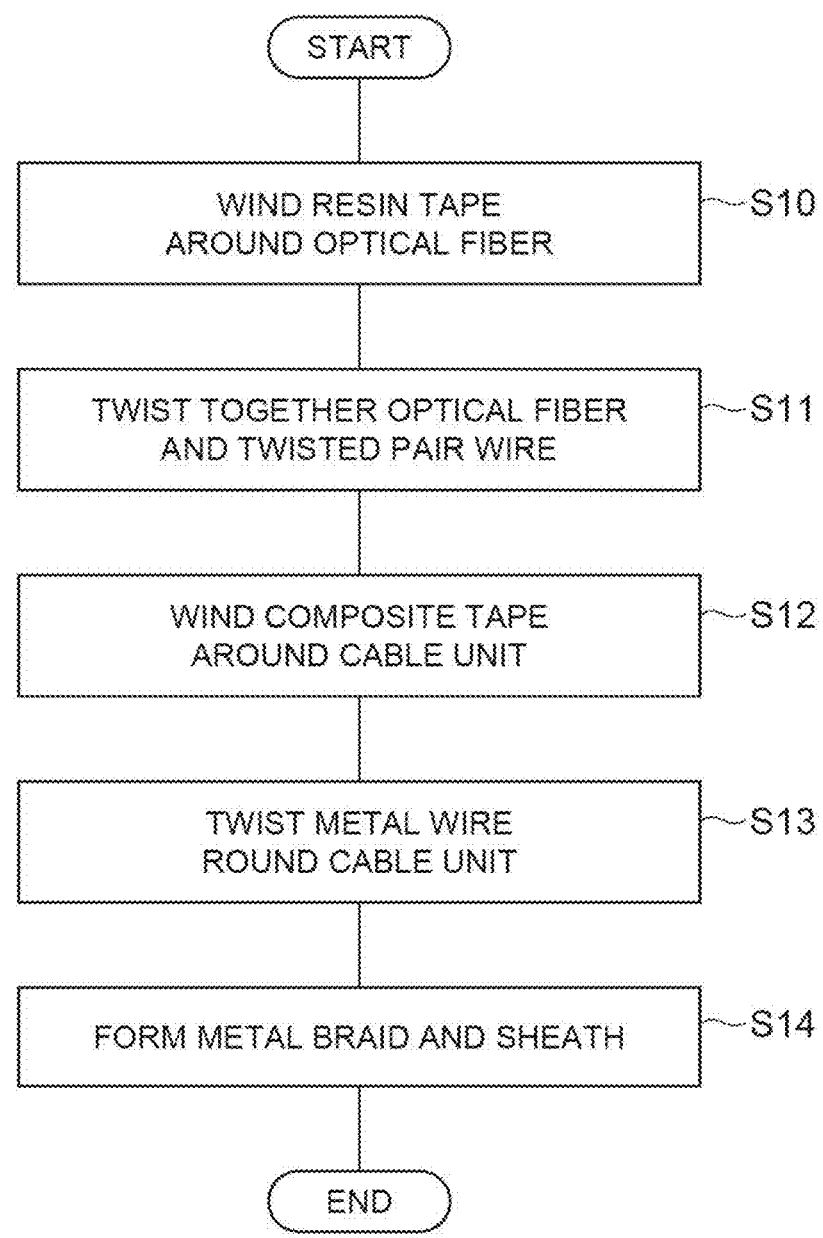
FIG. 3 is a flowchart showing a method for manufacturing an optical-electric composite cable.

Next, a method for manufacturing the optical-electric composite cable 1 will be described with reference to FIGS. 3 to 6. FIG. 3 is a flowchart showing a method for manufacturing the optical-electric composite cable 1.

Figure 4:
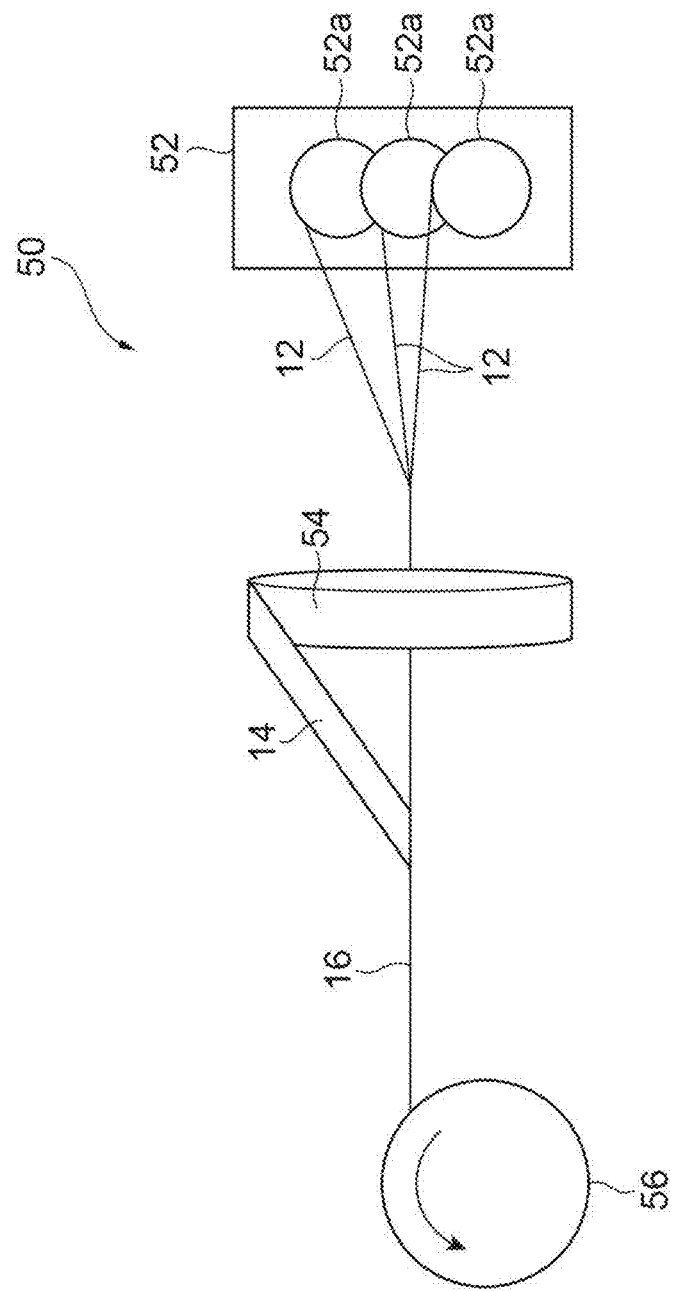
FIG. 4 is a view illustrating an apparatus for winding a resin tape around a plurality of optical fibers.

First, the resin tape 14 is wound around the plurality of optical fibers 12 to form the plurality of optical fibers 12 into one member which is an optical fiber bundle 16 (step S10). FIG. 4 illustrates an apparatus 50 for winding the resin tape 14 around the optical fibers 12. The apparatus 50 includes a fiber supply unit 52, a tape supply unit 54, and a winding unit 56.

The fiber supply unit 52 includes a plurality of reels 52a around each of which the optical fiber 12 is wound. The number of reels 52a included in the fiber supply unit 52 corresponds to the number of optical fibers 12 housed in the optical-electric composite cable 1. In the present embodiment, for example, the fiber supply unit 52 includes eight reels 52a, but illustration of some reels 52a is omitted in FIG. 4. The fiber supply unit 52 sends the optical fibers 12 from each of the reels 52a to the tape supply unit 54. A dancer roller may be provided between the fiber supply unit 52 and the tape supply unit 54 in the apparatus 50 to pull the optical fibers 12 with a predetermined tension to remove flexure.

Figure 5:
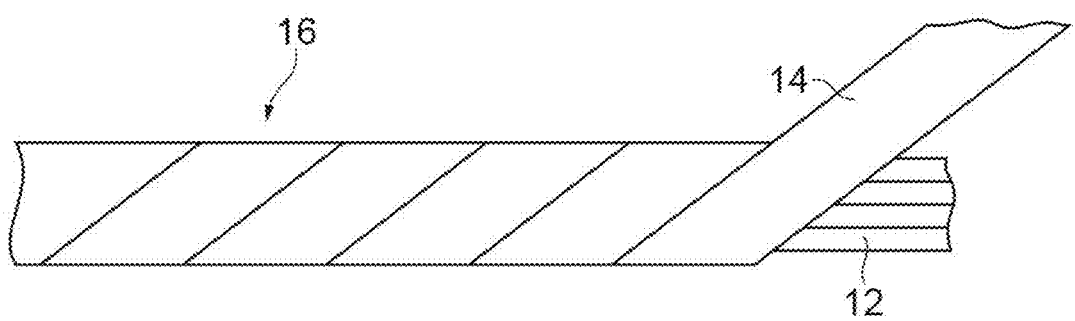
FIG. 5 is a view illustrating the optical fibers around which the resin tape is wound.

The tape supply unit 54 winds the resin tape 14 around the plurality of optical fibers 12. FIG. 5 illustrates a method of winding the resin tape 14 around the plurality of optical fibers 12. As illustrated in FIG. 5, the resin tape 14 is spirally wound around the plurality of optical fibers 12 in the present embodiment. At this time, the resin tape 14 may be wound to be partially overlapped with an adjacent winding portion thereof so that the entire surface of the plurality of optical fibers 12 bundled up together is covered. The resin tape 14 may be wound with a gap provided between winding portions of the resin tape 14 adjacent to each other so that parts of surfaces of the optical fibers 12 is exposed to the outside. Hereinafter, a bundle of the plurality of optical fibers 12 around which the resin tape 14 is wound is referred to as "optical fiber bundle 16."

When it is completed to wind the resin tape 14 around the optical fibers 12, the optical fiber bundle 16 is sent to the winding unit 56 illustrated in FIG. 4. The winding unit 56 includes a reel and winds the sent optical fiber bundle 16 using the reel. Thereby, step S10 is completed.

Figure 6:
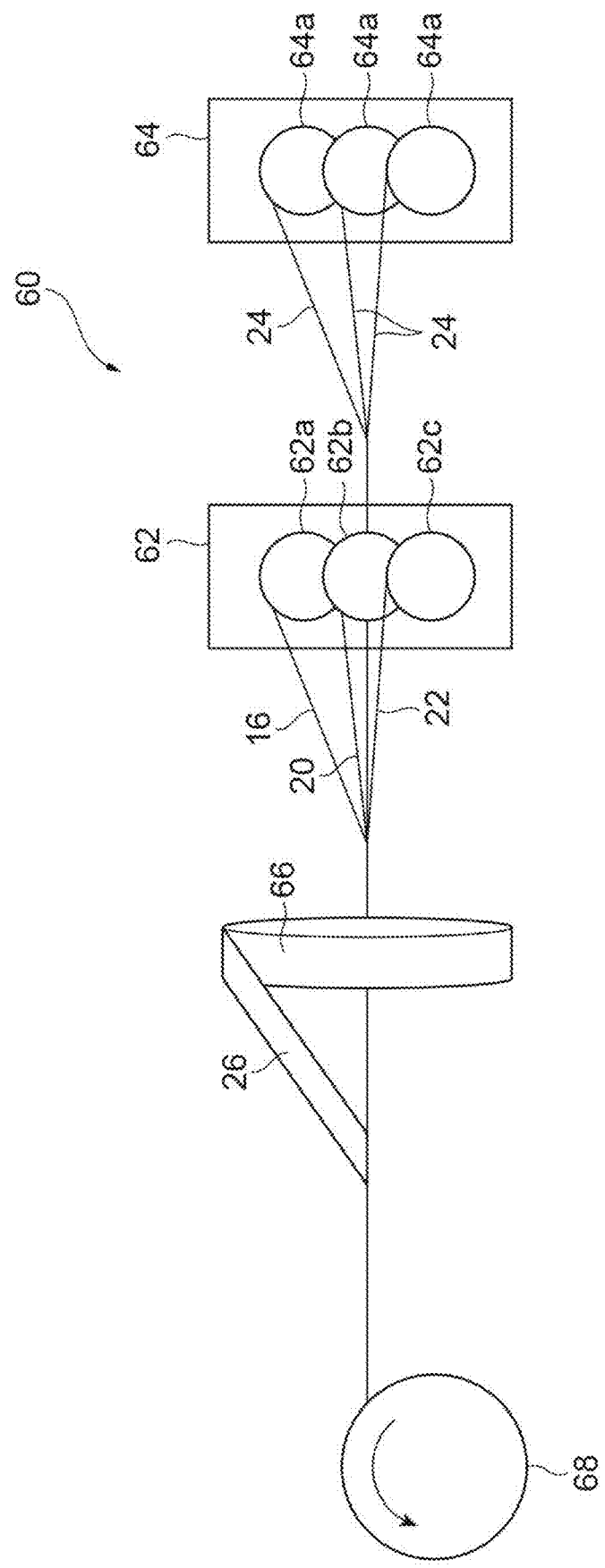
FIG. 6 is a view illustrating an apparatus for manufacturing the cable unit.

Next, the optical fiber bundle 16 (the plurality of optical fibers 12) and the twisted pair wire 20 are twisted together (step S11), and then, the composite tape 26 is wound around the cable unit 10 (step S12). Step S11 and step S12 will be described with reference to FIG. 6. FIG. 6 is a view illustrating an apparatus 60 for manufacturing the cable unit 10. The apparatus 60 includes a cable supply unit 62, a fiber supply unit 64, a tape supply unit 66, and a winding unit 68.

The cable supply unit 62 includes reels 62a, 62b, and 62c. The optical fiber bundle 16 is wound around the reel 62a. The twisted pair wire 20 is wound around the reel 62b. The drain wire 22 is wound around the reel 62c.

The optical fiber bundle 16, the twisted pair wire 20, and the drain wire 22 are respectively sent from the reels 62a, 62b, and 62c to the tape supply unit 66. The sent optical fiber bundle 16 and twisted pair wire 20 are twisted together at a predetermined pitch. For example, the optical fiber bundle 16 and the twisted pair wire 20 may be twisted together by rotating the cable supply unit 62 at a predetermined speed with an axis in a direction from the cable supply unit 62 toward the tape supply unit 66 (direction from the right side to the left side in FIG. 6) as a rotation axis. The drain wire 22 may be additionally twisted together or may be disposed to extend linearly.

The fiber supply unit 64 includes a plurality of reels 64a. The tensile strength fiber 24 is wound around each of the reels 64a. The tensile strength fiber 24 is sent from the reel 64a to the tape supply unit 66. The tensile strength fiber 24 is bundled up with the optical fiber bundle 16, the twisted pair wire 20, and the drain wire 22 in the process of reaching the tape supply unit 66. However, the tensile strength fiber 24 is disposed to extend linearly without being twisted with the optical fiber bundle 16 or the like.

A dancer roller may be provided between the cable supply unit 62 and the tape supply unit 66 in the apparatus 60 to pull the optical fiber bundle 16, the twisted pair wire 20, and the drain wire 22 with a predetermined tension to remove flexure. A dancer roller may be provided between the fiber supply unit 64 and the tape supply unit 66 in the apparatus 60 to pull the respective tensile strength fibers 24 with a predetermined tension to remove flexure.

The tape supply unit 66 winds the composite tape 26 around the optical fiber bundle 16, the twisted pair wire 20, the drain wire 22, and the tensile strength fibers 24. At this time, the optical fiber bundle 16, the twisted pair wire 20, the drain wire 22, and the tensile strength fibers 24 may be bundled up, and the composite tape 26 may be spirally wound around the bundle in the same manner as in the winding of the resin tape 14 illustrated in FIG. 5. In order for the composite tape 26 that is formed containing a metal material to function as a shield, the composite tape 26 is wound such that winding portions thereof adjacent to each other are partially overlapped to cover the entire surface of the optical fiber bundle 16 and the twisted pair wire 20. That is, the composite tape 26 is wound so that there is no gap between winding portions thereof.

When the optical fiber bundle 16, the twisted pair wire 20, the drain wire 22, and the tensile strength fibers 24 are wound by the composite tape 26, the cable unit 10 is completed. The completed cable unit 10 is sent to the winding unit 68 illustrated in FIG. 6. The winding unit 68 includes a reel and winds the sent cable unit 10 with the reel. As described above, step S11 and step S12 end.

Next, the plurality of metal wires 30 are twisted together around the cable unit 10 (step S13). As illustrated in FIG. 1, the plurality of metal wires 30 having different outer diameters are twisted together to surround the cable unit 10. In order to fill voids generated between the metal wires 30, a predetermined amount of the intervening string 32 is twisted around the cable unit 10 together with the metal wires 30.

Next, when step S13 ends, the metal braid 42 and the sheath 40 are formed on an outer side of the metal wires 30 or the like (step S14). Specifically, the metal braid 42 is wound around the plurality of metal wires 30, and then the sheath 40 is formed using extrusion molding. As described above, the optical-electric composite cable 1 has been manufactured.

As described above, according to the optical-electric composite cable 1, the optical fibers 12 and the twisted pair wire 20 are twisted together to form the cable unit 10, and the metal wires 30 are disposed around the cable unit 10. That is, the optical-electric composite cable 1 is configured such that the twisted pair wire 20 is disposed on an inward side from positions at which the metal wires 30 are disposed in the optical-electric composite cable 1. In this configuration, the twisted pair wire 20 does not protrude significantly to the outside of the optical-electric composite cable 1, and thus distorted bulging is suppressed. Thus, the optical-electric composite cable 1 can have a satisfactory external appearance. In addition, the twisted pair wire 20 is disposed by effectively utilizing a region close to the optical fibers 12, thereby the optical-electric composite cable 1 can be thin. Therefore, the optical-electric composite cable 1 which is thin and has a satisfactory external appearance can be realized while including the twisted pair wire 20.

According to the optical-electric composite cable 1, the cable unit 10 is disposed substantially at the center of the sheath 40. According to this configuration, the optical-electric composite cable 1 can be thin as a whole and have a satisfactory external appearance by utilizing a region around the cable unit 10 in a well-balanced manner.

According to the optical-electric composite cable 1, the plurality of optical fibers 12 are provided, and the cable unit 10 includes the resin tape 14 wound around the plurality of optical fibers 12. According to this configuration, the plurality of optical fibers 12 are bundled up with each other by the resin tape 14. Thus, in the manufacturing process of the optical-electric composite cable 1, it is possible to prevent loosened optical fibers 12 from being sandwiched between the twisted pair wire 20 and being damaged. Therefore, manufacturing efficiency of the optical-electric composite cable 1 can be stabilized and improved.

According to the optical-electric composite cable 1, the resin tape 14 is formed of polyethylene terephthalate having a thickness of 50 µm or more and 500 µm or less. According to this configuration, the resin tape 14 is formed of polyethylene terephthalate having a thickness of 50 µm or more and has a sufficient strength, thereby the resin tape 14 can be prevented from being torn when it is wound around the optical fibers 12. In addition, the resin tape 14 has a thickness of 500 µm or less, thereby the optical-electric composite cable 1 becoming thicker by an amount of that of the resin tape 14 can be prevented.

According to the optical-electric composite cable 1 according to the present embodiment, the cable unit 10 includes the composite tape 26 wound around the optical fibers 12 and the twisted pair wire 20.

According to this configuration, the optical fibers 12 and the twisted pair wire 20 are bundled up and not separated by the composite tape 26 that is wound around the cable unit 10. Thus, a trouble in which the optical fiber 12 or the twisted pair wire 20 that is loosened becomes entangled in the manufacturing apparatus during manufacture of the optical-electric composite cable 1 can be prevented. Therefore, manufacturing efficiency of the optical-electric composite cable 1 can be stabilized. In this configuration, the composite tape 26 may be formed of a composite material containing a metal material and a synthetic resin. According to this configuration, the composite tape 26 containing a metal material functions as a shield to block noise entering the twisted pair wire 20 from the outside of the optical-electric composite cable 1. Therefore, a communication using the optical-electric composite cable 1 can be stable.

According to the optical-electric composite cable 1 of the present embodiment, the cable unit 10 includes the tensile strength fiber 24 extending linearly in a direction in which the cable unit 10 extends. According to this configuration, the tensile strength fiber 24 can prevent the optical fibers 12 from being stretched and broken.

According to the method for manufacturing the optical-electric composite cable 1 of the present embodiment, the optical fibers 12 and the twisted pair wire 20 are twisted together into a unit, and the metal wires 30 are disposed around the cable unit 10. Thus, the twisted pair wire 20 does not protrude significantly to the outside of the optical-electric composite cable 1, thereby the optical-electric composite cable 1 in which distorted bulging is suppressed can be manufactured. In addition, it is not necessary to provide a tube-shaped resin into which a bundle of the optical fibers 12 is inserted, thereby the thin optical-electric composite cable 1 can be formed.

Modified Example

Figure 7:
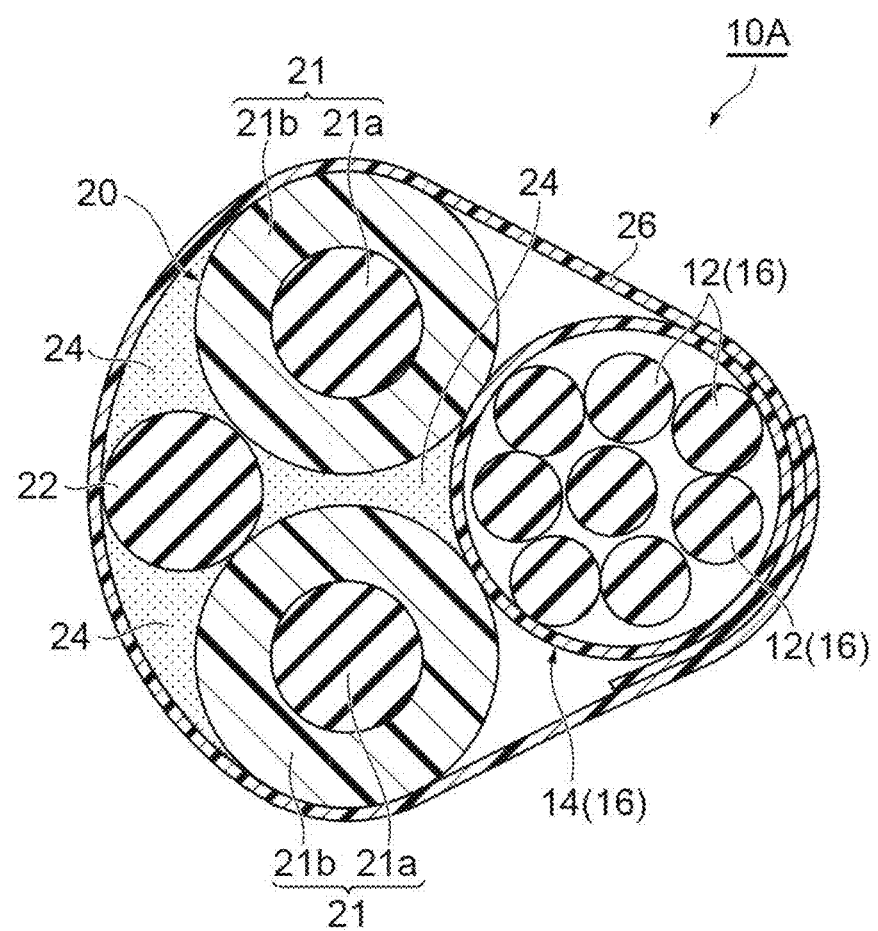
FIG. 7 is a cross-sectional view illustrating a modified example of the cable unit.

A modified example of the cable unit 10 will be described with reference to FIG. 7. FIG. 7 is a cross-sectional view of a cable unit 10A according to the modified example. In the following description, differences from the embodiments described above with reference to FIG. 2 will be mainly described, and description of common points may be omitted.

The cable unit 10A includes the plurality of optical fibers 12 and the resin tape 14 wound around the optical fibers 12. In the embodiment illustrated in FIG. 2, in the cross-sectional view of the cable unit 10, two rows of the optical fibers 12 with four in a row are disposed side by side substantially in parallel. Thus, a cross-sectional shape of the resin tape 14 surrounding the optical fibers 12 has a flat elliptical shape. On the other hand, in the optical fibers 12 of the cable unit 10A according to the present modified example, the other optical fibers 12 are positioned to surround one optical fiber 12 in a cross-sectional view of the cable unit 10A. Thus, the cross-sectional shape of the resin tape 14 has a shape that is more like a circle than that of the embodiment illustrated in FIG. 2.

The cable unit 10A includes the composite tape 26 wound around the optical fibers 12 and the twisted pair wire 20. In the cross-sectional view of the cable unit 10A, two metal wires 21 constituting the twisted pair wire 20 and the optical fiber bundle 16 are disposed to be positioned at vertices of a triangle. Thus, the composite tape 26 is wound to have a substantially triangular shape in a cross-sectional view. In the composite tape 26, a region connecting the twisted pair wire 20 and the optical fiber bundle 16 is provided substantially flat. On the other hand, the drain wire 22 is disposed between the two metal wires constituting the twisted pair wire 20 and the composite tape 26. Thus, in the composite tape 26, a region connecting the two metal wires constituting the twisted pair wire 20 is provided to bulge outward to draw an arc.

Similarly to the resin tape 14 illustrated in FIG. 5, the composite tape 26 is spirally wound around the optical fiber bundle 16 and the twisted pair wire 20. At this time, the composite tape 26 is wound to be partially overlapped so that the entire surface of the optical fiber bundle 16 and the twisted pair wire 20 is covered. Thus, as illustrated in the cross-sectional view of FIG. 7, the composite tape 26 is positioned to partially overlap on an outer surface of the optical fiber bundle 16 (the same applies to FIG. 1 but is omitted).

The cable unit 10A includes the tensile strength fibers 24. In the present modified example, the tensile strength fibers 24 are disposed not only in a space between the optical fibers 12 and the twisted pair wire 20, but also in a space between the twisted pair wire 20 and the drain wire 22 and a space between the twisted pair wire 20 and the composite tape 26. The tensile strength fibers 24 are not limited to the above-described spaces and may also be disposed in other spaces in the composite tape 26.

As in the present modified example, when the region connecting the twisted pair wire 20 and the optical fiber bundle 16 in the composite tape 26 is configured to be substantially flat, the cable unit 10A can prevents from being thicker even when the composite tape 26 is provided. That is, a shape of the cable unit 10A can be made even smaller than the aspect illustrated in FIG. 1. Thus, according to this modified example, the optical-electric composite cable 1 can be even thinner and have a satisfactory external appearance.

When the composite tape 26 is wound to be partially overlapped as in the present modified example, the entire surface of the twisted pair wire 20 can be covered without a gap, and noise can be blocked more reliably by the composite tape 26. In the present modified example, the tensile strength fibers 24 are disposed in a plurality of spaces in the composite tape 26. Thus, even when a tensile force is applied to the optical fibers 12, the tensile strength fibers 24 can further prevent breakage or the like due to the tensile force.

While the embodiments and the examples of the present disclosure have been described in detail above, the present disclosure is not limited to the above-described embodiments and examples, and can be applied to various embodiments or examples. Outer diameters and thicknesses of the above-described constituent members or the number of optical fibers or metal wires are merely examples, and the present disclosure is not limited thereto.

What is claimed is:

1. An optical-electric composite cable comprising:
   a cable unit comprising an optical fiber bundle, a twisted pair wire, and a tensile strength fiber that extends linearly in a direction in which the cable unit extends on an inner side thereof, the optical fiber bundle including a plurality of optical fibers and a first tape wound around the plurality of optical fibers, wherein the twisted pair wire is further twisted with the optical fiber bundle;
   at least one metal wire disposed around the cable unit; and
   a sheath surrounding the cable unit and the at least one metal wire.

2. The optical-electric composite cable according to claim 1, wherein the cable unit is disposed at substantially a center of the sheath.

3. The optical-electric composite cable according to claim 1, wherein the first tape is formed of polyethylene terephthalate having a thickness of 50 μm or more and 500 μm or less.

4. The optical-electric composite cable according to claim 1, wherein the first tape is spirally wound around the plurality of optical fibers in a direction in which the cable unit extends.

5. The optical-electric composite cable according to claim 1, wherein the plurality of optical fibers each have a diameter of 0.25 mm or more and 0.9 mm or less.

6. The optical-electric composite cable according to claim 1, wherein the plurality of optical fibers include an even number of optical fibers.

7. The optical-electric composite cable according to claim 1, wherein the cable unit includes a second tape wound around the optical fiber bundle and the twisted pair wire.

8. The optical-electric composite cable according to claim 7, wherein the second tape is formed of a composite material containing a metal material and a synthetic resin.

9. The optical-electric composite cable according to claim 7, wherein the second tape contains at least one of a copper foil and an aluminum foil, and a polyethylene terephthalate resin.

10. The optical-electric composite cable according to claim 7, wherein the second tape is spirally wound around the optical fiber bundle and the twisted pair wire in a direction in which the cable unit extends.

11. The optical-electric composite cable according to claim 7, wherein the second tape is wound so that winding portions of the second tape adjacent to each other are partially overlapped.

12. The optical-electric composite cable according to claim 7, wherein the second tape is flat between a point in contact with the twisted pair wire and a point in contact with the first tape wound around the plurality of optical fibers.

13. The optical-electric composite cable according to claim 7, wherein the cable unit includes a drain wire which is disposed to be sandwiched between the twisted pair wire and the second tape.

14. The optical-electric composite cable according to claim 13, wherein the drain wire is a conducting wire made of a metal.

15. The optical-electric composite cable according to claim 1, wherein the tensile strength fiber is disposed in at least one region of a region adjacent to the optical fibers, a region between the optical fibers and the twisted pair wire, a region between a pair of metal wires constituting the twisted pair wire, and a region between the twisted pair wire and a drain wire.

16. A method for manufacturing an optical-electric composite cable comprising:
   forming a cable unit by twisting an optical fiber bundle and a twisted pair wire, the optical fiber bundle including a plurality of optical fibers and a first tape wound around the plurality of optical fibers, and by bundling up a tensile strength fiber with the optical fiber bundle and the twisted pair wire;
   disposing at least one metal wire around the cable unit; and
   forming a sheath to surround the cable unit and the at least one metal wire.

17. The method for manufacturing an optical-electric composite cable according to claim 16, wherein the forming of the cable unit includes forming the optical fiber bundle by winding a resin tape around the plurality of optical fibers.

18. The method for manufacturing an optical-electric composite cable according to claim 16, wherein the forming of the cable unit includes winding a composite tape containing a metal material and a synthetic resin around the optical fiber bundle and the twisted pair wire.

* * * * *